(No Model.) 3 Sheets—Sheet 1.

C. WAHRMUND, Jr.
COMBINED WHEEL CULTIVATOR AND PLOW.

No. 354,956. Patented Dec. 28, 1886.

WITNESSES
Wm. J. Tanner,
Fred. G. Fischer.

INVENTOR
Charles Wahrmund Jr.
By R. E. Pairo
his Attorney (No Model.) 3 Sheets—Sheet 2.

C. WAHRMUND, Jr.
COMBINED WHEEL CULTIVATOR AND PLOW.

No. 354,956. Patented Dec. 28, 1886.

Witnesses
Wm. J. Tanner
Fred. G. Fischer

Inventor
Charles Wahrmund Jr.
By R. E. Pairo,
his Attorney

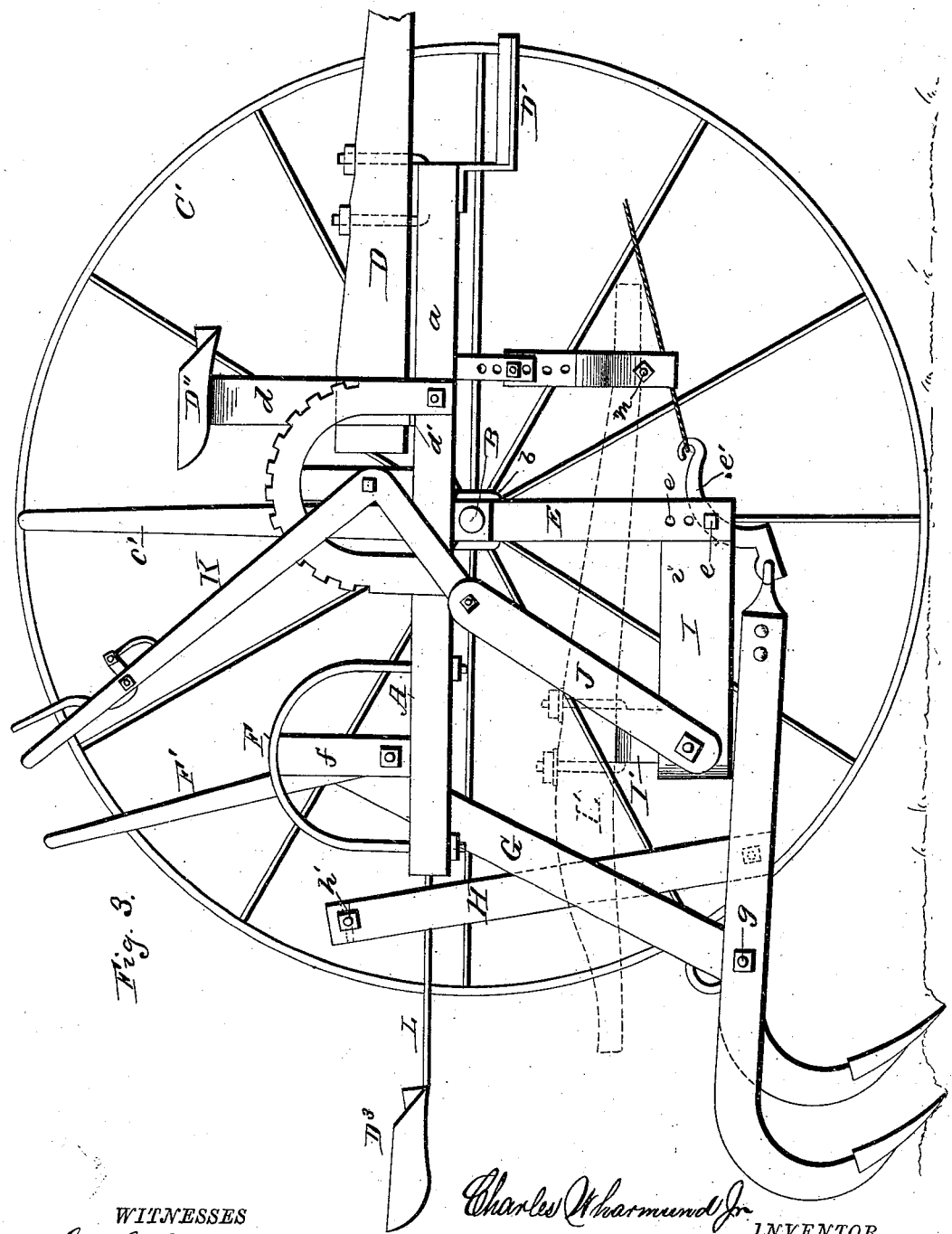

UNITED STATES PATENT OFFICE.

CHARLES WAHRMUND, JR., OF FREDERICKSBURG, TEXAS.

COMBINED WHEEL CULTIVATOR AND PLOW.

SPECIFICATION forming part of Letters Patent No. 354,956, dated December 28, 1886.

Application filed January 8, 1886. Serial No. 188,026. (No model.)

*To all whom it may concern:*

Be it known that I, CHARLES WAHRMUND, Jr., a citizen of the United States, residing at Fredericksburg, in the county of Gillespie and State of Texas, have invented certain new and useful Improvements in a Combined Wheel Cultivator and Plow; and I do hereby declare the following to be a full, clear, and exact description of the invention, such as will enable others skilled in the art to which it appertains to make and use the same.

My invention relates to certain new and useful improvements in wheel-cultivators; and it consists in the construction and combination of the parts, as will be hereinafter fully set forth, and specifically pointed out in the claims, whereby either mold-board plows or shovel-cultivators may be used upon a common frame.

Figure 1:
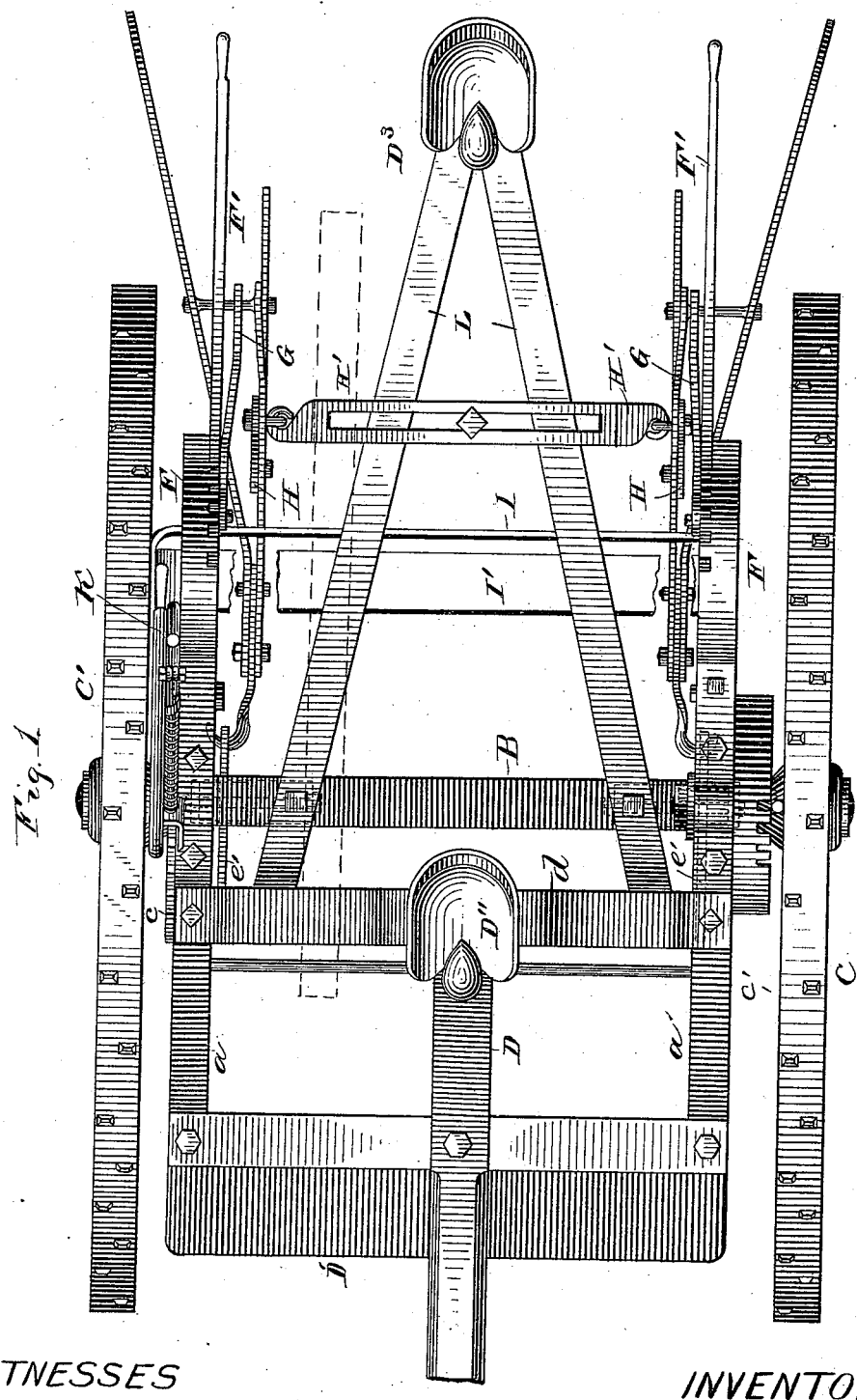
Figure 2:
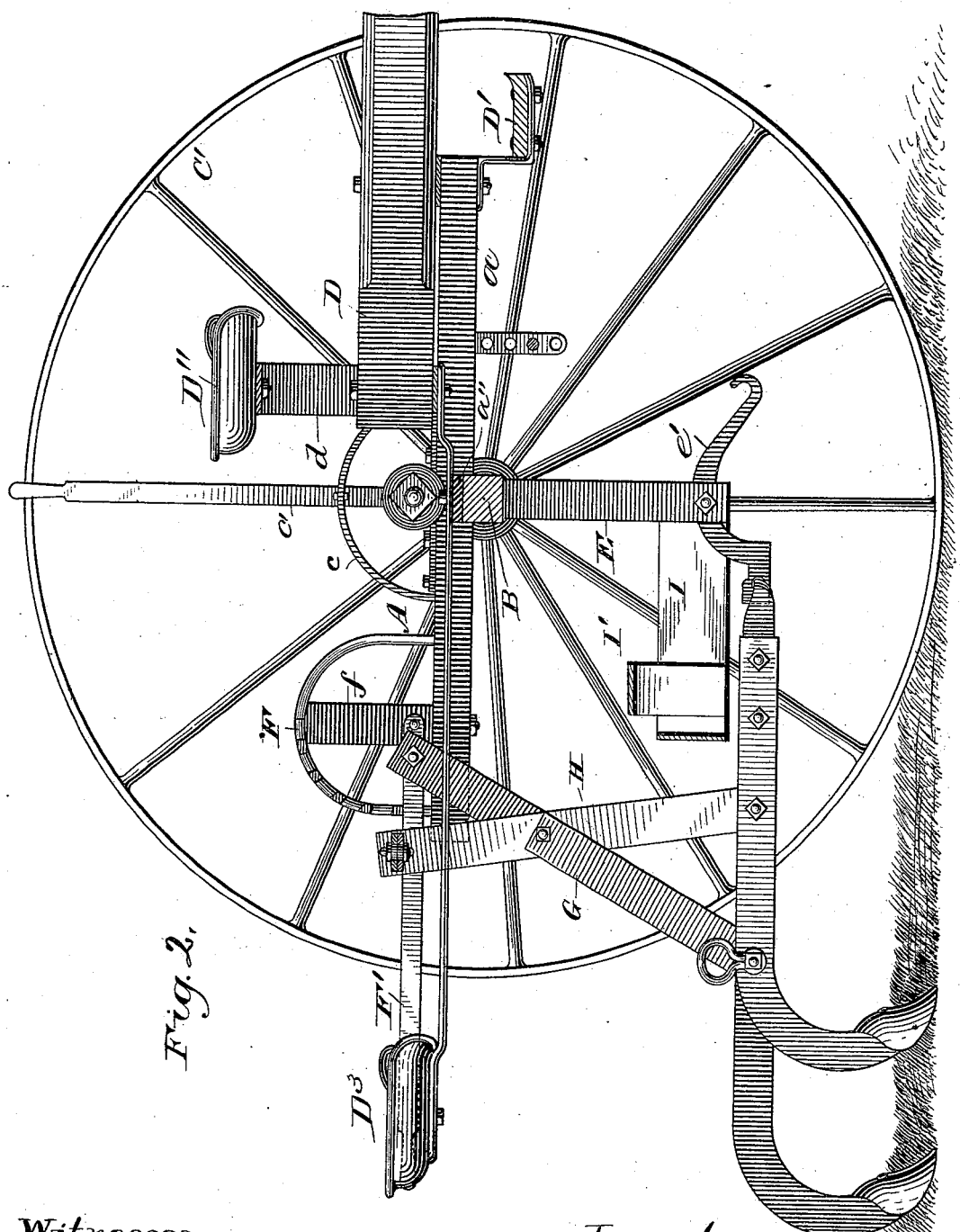

In the accompanying drawings, which illustrate my invention, Figure 1 is a plan view of a wheel-cultivator constructed in accordance with my invention. Fig. 2 is a sectional view taken through the line $x\,x$ of Fig. 1, and Fig. 3 is a side view.

A refers to what I term the "main frame," said frame consisting of side beams, $a\,a'$, said beams being connected to each other centrally by a transverse beam, $a''$, and immediately beneath the same a metallic axle, B, is secured to the side pieces of the main frame A by clips $b\,b$. On the left-hand side of the frame the axle B projects beyond the same, so as to form a bearing for the wheel C. The opposite wheel, C', is journaled on a short crank-axle, C'', said crank-axle being pivotally attached to the upper side of the frame A in suitable bearings. To the beam $a'$ of the frame, above the crank-axle C'', is attached a curved rack-bar, $c$, which is provided with notches with which a projection on the side of a spring-lever, $c'$, engages, said lever $c'$ being rigidly attached at its lower end to the crank-axle, whereby the supporting-wheel of the frame may be elevated or lowered, as desired. The side beams of the frame are connected to each other in front of the axle by transverse bars, to which are rigidly secured the draft-tongue D.

To the front end of the beams $a\,a'$ there is attached a board, D', upon which the driver, who occupies the seat D'', may place his feet.

The driver's seat D'' is attached to the main frame by a bent bar, $d$.

To the transverse bar $a''$ of the main frame bars or supports L L are rigidly attached, said bars being bent at their front ends outwardly, so as to engage with the side beams, $a\,a'$, where they are attached by the same bolts which hold the seat-supporting bar $q$, and the transverse bar $d'$ under the tongue in place. These supports L L converge toward each other, rear of the main frame, and are provided at their point of junction with a driver's seat, $D^3$, upon which the person who attends to the cultivators or plows rides.

To the under side of the axle B, near each of the longitudinal beams $a\,a'$, are secured bars E, the parallel depending portions thereof being provided with perforations, through which pass bolts $e\,e$, by means of which the draft-bars $e'$ are secured to the depending bars or frames E. To the forward hooked end of these draft-bars $e'$ flexible connections are attached, which connect the same with the whiffletrees attached to the tongue D. The rear ends of the draft-bars $e'$ are perforated for the reception of the clevis of the cultivator-frames.

At the rear ends of the beams $a\,a'$ of the main frame are secured segmental notched bars F, which have a central brace, $f$, to which are pivoted spring-levers F', near the ends of which are attached bars G, the lower ends of which are secured to the cultivator-frames by bolts $g$, which pass through the beams thereof.

It will be readily seen that by elevating the lever F the cultivators will be raised and that the depth which they will enter the soil can be regulated. The inner beams of the cultivators have attached thereto upwardly-projecting bars H, and these bars H are connected to each other at their upper ends, which lie normally above the main frame, by means of slotted cross-bars H' H', the ends of which are hooked, and engage with eyes $h'$, attached to the upper ends of the bars H. The cross-bars H' can be adjusted upon each other, so as to vary the distance or width between the cultivators.

The levers by which the cultivators are raised and lowered are located so as to be within easy access of the person who occupies the rear seat.

To the depending bars E, by means of bolts e, is secured the bent bar I, the forward projections, i, thereof being secured to the depending bars E by the bolts e, hereinbefore referred to. This bar is provided on one side with an upwardly-projecting link, J, which is secured to the ends of a lever, K, which is pivoted to a segmental rack attached to the frame above the axle. When the bar I is depressed by means of the lever, it will bear upon the forward ends of the cultivator, so as to lower the front portion of the same, thereby changing the angle at which the shovel of the cultivators will enter the ground. The bar I is provided near its rear portion with a flat cross-bar, I', to which the beam of an ordinary plow may be coupled. When a plow is used upon the frame, it will be understood that the cultivators are removed. The plows L' L' may occupy relatively the same position as the cultivators, and the forward ends of the beams of said plows are coupled to a cross-bar, m, which is secured to the front portion of the frame. In some instances, when it is desired to reorganize the parts so as to convert the device into a wheel-cultivator, the plow-bail may be removed. When the frame is used as a wheel-cultivator, the front seat, D'', may be removed, and when the same is employed as a riding sulky-plow the rear seat can be removed, said seats being attached to the frame so as to be easily removed therefrom. By means of the device hereinbefore described I am enabled to provide a frame which is supported on wheels, which can be utilized in cultivating or plowing.

The cultivators or plows used in connection with the frame are of ordinary construction, and may be used independent thereof.

I claim—

1. In a wheel-cultivator, a frame supported on wheels and provided centrally with depending bars E E, to which the forward ends of the cultivators are attached, levers pivoted to the rear portion of the frame and connected to the cultivators for raising and lowering the same, a transverse frame, I, pivotally attached under the main frame so as to bear upon the forward ends of the cultivators, and bars for regulating the width between said cultivators, the parts being combined and organized substantially as shown, and for the purpose set forth.

2. In a cultivator, a main frame provided with supporting-wheels and detachable front and rear seats, for the purpose specified, depending bars with means for attaching the forward ends of the cultivators thereto, bent bars e', adjustably attached to the depending bars E, the draft-chain attached to levers c', and lifting connections for elevating and lowering the cultivators, substantially as shown, and for the purpose set forth.

3. In combination with a cultivator, a main frame mounted on wheels, substantially as described, the rear end of said frame being opened, detachable seats mounted on said frame, depending bars E secured to the axle and to the main frame, coupling devices e, secured to said depending bars, a pivoted frame, I, also attached to the depending bars E, and a lever for depressing the same, cultivators provided with bars and levers for elevating and depressing the same and adjusting laterally the cultivators, the parts being organized substantially as set forth.

In testimony whereof I affix my signature in presence of two witnesses.

CHARLES WAHRMUND, Jr.

Witnesses:
ADOLPH WAHRMUND,
G. BERGMAN.